(No Model.)
F. W. KENNEY.
SHEARS.
No. 306,758. Patented Oct. 21, 1884.
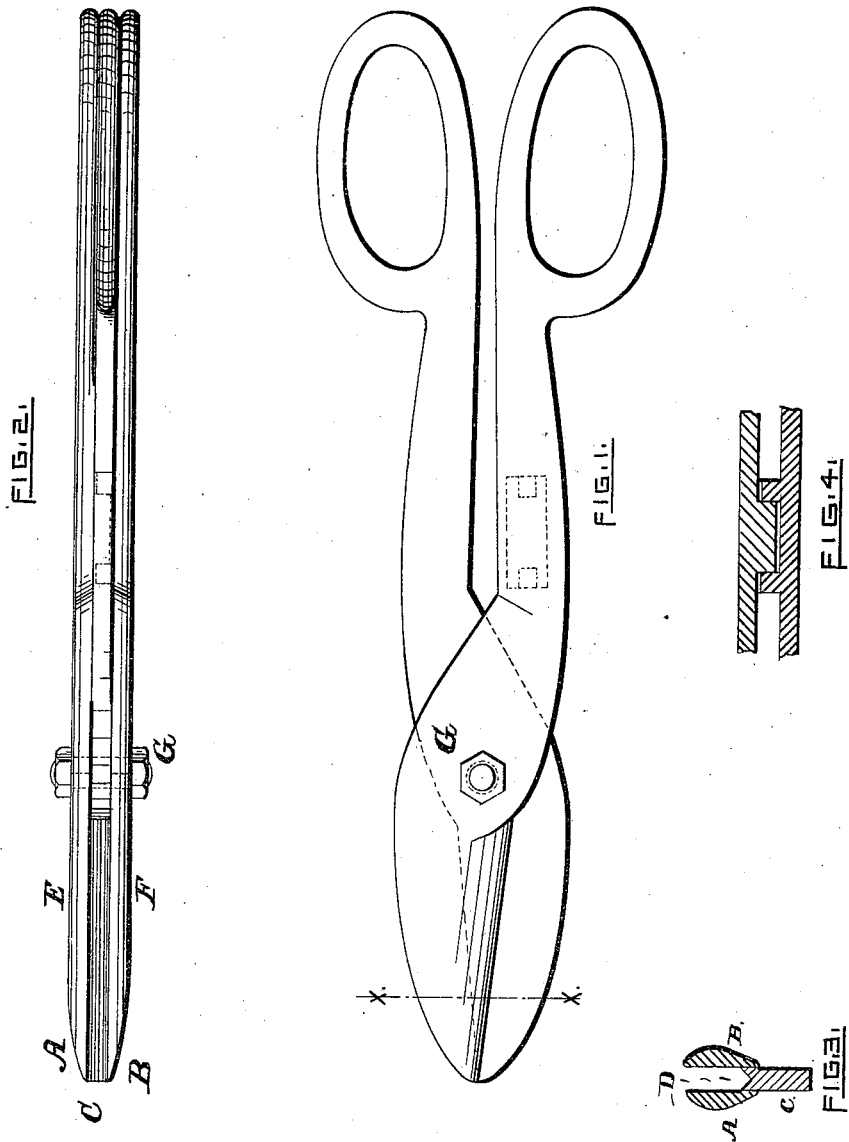
WITNESSES:
Charles H. Titus
James D. O'Hern
INVENTOR
Francis W. Kenney
By Walter B. Vincent Atty.

UNITED STATES PATENT OFFICE.

FRANCIS W. KENNEY, OF PROVIDENCE, RHODE ISLAND.

SHEARS.

SPECIFICATION forming part of Letters Patent No. 306,758, dated October 21, 1884.

Application filed April 30, 1884. (No model.)

*To all whom it may concern:*

Be it known that I, FRANCIS W. KENNEY, of Providence, in the State of Rhode Island, have made certain new and useful Improvements in Hand Shears or Snips; and I do hereby declare that the following specification, taken in connection with the drawings making a part of the same, is a full, clear, and exact description thereof.
Figure 1 is a side or flat view of my device. Fig. 2 is a top or edge view of same. Fig. 3 is a section on line $x\,x$. Fig. 4 is a section of device for equalizing the strain upon the handles.
My invention more particularly relates to shears or snips used by sheet-metal workers, and has for its object the ready adaptation of the same to right and left hand work, as well as the cutting or trimming of cylindrical pipes or other articles; and it consists in the construction and arrangement of devices, as hereinafter described.

Sheet-metal workers are not only obliged to provide themselves with both right and left hand shears, but to carry them from place to place where it is likely that they may be required. With my improved shears a portion of the first outlay can be saved, as one pair only will be required, and the transportation of second pair from place to place avoided.

In my invention I make the shears in three parts, A, B, and C, as shown in Figs. 2 and 3, the latter being combined with either or both of the former, according to the kind of work to be done. The blade D of the part C is grooved, as shown in Fig. 3, and presents a cutting-edge to each of the blades E and F of the parts A B.

G is a bolt by which the parts are held together.

It will now be readily seen that when a pair of right-hand shears are wanted the part A may be removed and the parts B and C secured together by the bolt G; but if left-hand shears are required the part B is removed, leaving the parts A and C to act together.

To cut off or trim pipes and cylindrical articles, the three parts A B C are used together, as shown in Figs. 2 and 3, with which the metal is chipped or snipped off in a manner well understood. In such operation the parts A and B operate together, and to secure their uniform action and avoid any tendency to wring or twist I place upon the inside of the handles of the parts A and B a locking device, as shown in Fig. 4.

In severing a pipe with my device the ends are left smooth and require no further finishing.

What I claim as my invention, and desire to secure by Letters Patent, is—

The right and left hand shears described, composed of the double-edged part C and the two detachable single-edged parts A and B, the one being right and the other left hand, and placed upon opposite sides of the part C and pivoted thereto, substantially as and for the purpose set forth.

FRANCIS W. KENNEY.

Witnesses:
WALTER B. VINCENT,
CHARLES H. TITUS.